United States Patent
Guillez et al.

(10) Patent No.: US 7,334,832 B2
(45) Date of Patent: Feb. 26, 2008

(54) ROOF RETRACTABLE INTO THE REAR DECK OF A MOTOR VEHICLE

(75) Inventors: Jean-Marc Guillez, Cirieres (FR); Gérard Queveau, Le Pin (FR); Paul Queveau, Montravers (FR)

(73) Assignee: Societe Europeenne de Brevets Automobiles, Paris (FR)

( * ) Notice: Subject to any disclaimer, the term of this patent is extended or adjusted under 35 U.S.C. 154(b) by 181 days.

(21) Appl. No.: 10/512,534

(22) PCT Filed: Apr. 16, 2003

(86) PCT No.: PCT/FR03/01225

§ 371 (c)(1),
(2), (4) Date: Jan. 30, 2006

(87) PCT Pub. No.: WO03/091054

PCT Pub. Date: Nov. 6, 2003

(65) Prior Publication Data

US 2005/0127709 A1    Jun. 16, 2005

(30) Foreign Application Priority Data

Apr. 25, 2002  (FR)  ................... 02 05211

(51) Int. Cl.
B60J 7/00 (2006.01)

(52) U.S. Cl. .................. 296/107.17; 296/107.01; 296/107.08; 296/107.16

(58) Field of Classification Search ........... 296/107.01, 296/107.08, 107.16, 107.17
See application file for complete search history.

(56) References Cited

U.S. PATENT DOCUMENTS 6,131,988 A  10/2000  Queveau et al. ....... 296/107.17

FOREIGN PATENT DOCUMENTS

EP    0 764 553 A1    3/1997
EP    1 193 093 A1    4/2002

*Primary Examiner*—Lori L. Lyjak
(74) *Attorney, Agent, or Firm*—Nawrocki, Rooney & Sivertson, P.A.

(57) ABSTRACT

The invention concerns a retractable roof consisting of at least two elements (1, 2) for a vehicle comprising a passenger compartment (7) and a rear deck (6), said roof including a front element (2) and a rear element (1) mobile between a first position wherein they cover the passenger compartment (7) and a second position wherein they are superimposed horizontally in the rear deck (6), the displacement of the rear element (1) towards the rear deck (6) being driven by at least an arm articulated (5) at one first of its ends to the chassis, and the front element (2) being linked to the rear element (1) via two levers (13, 14) articulated each at one first (15, 16) of its ends to said front element. The invention is characterized in that it comprises a link rod (10) and a support element (18), said arm (5) being articulated at its second end to said link rod (10) whereon are likewise articulated the two ends of said levers (13, 14), said link rod (10) being articulated to said support element (18) bearing a cam path (19) adapted to co-operate with a cam follower (20) integral with said arm (5).

10 Claims, 4 Drawing Sheets

ROOF RETRACTABLE INTO THE REAR DECK OF A MOTOR VEHICLE

The present invention concerns a retractable roof in at least two elements, for vehicles comprising a chassis, a cabin for passengers and a rear boot, and more particularly such a retractable roof comprising a front roof element and a rear roof element, these two elements being able to move between a first position in Which they cover the cabin and a second position in which they are superimposed substantially horizontally in the rear boot, the movement of the rear element towards the rear boot being controlled by at least one arm articulated at a first of its ends on the chassis, and the front element being connected to the rear element by means of two levers each articulated at a first of these ends on the said front element, these two levers forming a deformable quadrilateral.

Such retractable roofs are described for example in the French patent applications N° 0014187 and N° 0202154.

These retractable roofs generally give satisfaction.

However, in some cases, the front part of the rear element could come into abutment in the vehicle damper when gaining access to the luggage.

The present invention aims to mitigate this drawback.

More particularly, the aim of the invention is to provide a retractable roof of the type stated above which allows sufficient clearance of the front part of the rear element with respect to the damper during access to the luggage.

To this end, the object of the invention is a retractable roof in at least two elements, for vehicles comprising a chassis, a cabin for passengers and a rear boot, the said roof comprising a front roof element and a rear roof element, these two elements being able to move between a first position in which they cover the cabin and a second position in which they are superimposed substantially horizontally in the rear boot, the movement of the rear element towards the rear boot being controlled by at least one arm articulated at a first of its ends on the chassis, and the front element being connected to the rear element by means of two levers each articulated at a first of its ends on the said front element, these two levers forming a deformable quadrilateral, characterised by the fact that it comprises a connecting rod and a support element, the said arm being articulated at its second end on the said connecting rod, on which there are also articulated the second ends of the said levers, the said connecting rod being articulated on the said support element carrying a cam track able to cooperate with a cam follower fixed to the said arm.

Thus the second ends of the arms and levers are not articulated directly on the rear roof element.

They are articulated on a first connecting rod itself articulated on a support element, the movement of the connecting rod being guided by the cooperation of the cam follower fixed to the arm and of the cam track fixed to the support element.

It is thus possible to make the connecting rod rise with respect to the damper and thus obtain the required result.

The cam follower can be mounted on the said arm projecting from its second end, substantially opposite to its first end.

The said arm can be articulated on the said connecting rod substantially between the points of articulation of the two said levers.

More particularly, the point of articulation of the said arm can be substantially equidistant from the said points of articulation of the said levers.

One of the said levers can be articulated on the said connecting rod substantially between the points of articulation of the other lever and of the said support element.

More particularly, the point of articulation of one of the said levers can be substantially equidistant from the point of articulation of the other lever and the point of articulation of the said support element.

The points of articulation of the arm of the levers and of the support element can be generally aligned on the said connecting rod.

The said cam track can be curved with its concavity generally turned towards the bottom or towards the point of articulation of the said arm on the said connecting rod.

The curvature of the cam track can increase from front to rear.

Another object of the present invention is a vehicle comprising such a roof as described above.

A description will now be given by way of non-limiting example of a particular embodiment of the invention with reference to the accompanying schematic drawings, in which.

The roof comprises here a rear element 1 and a front element 2. The rear element 1 joins the front edge 3 of the rear boot to the rear edge of the front element 2. The front element 2 joins the front edge 4 of the rear element 1 to the top edge of the vehicle windscreen.

Figure 1:
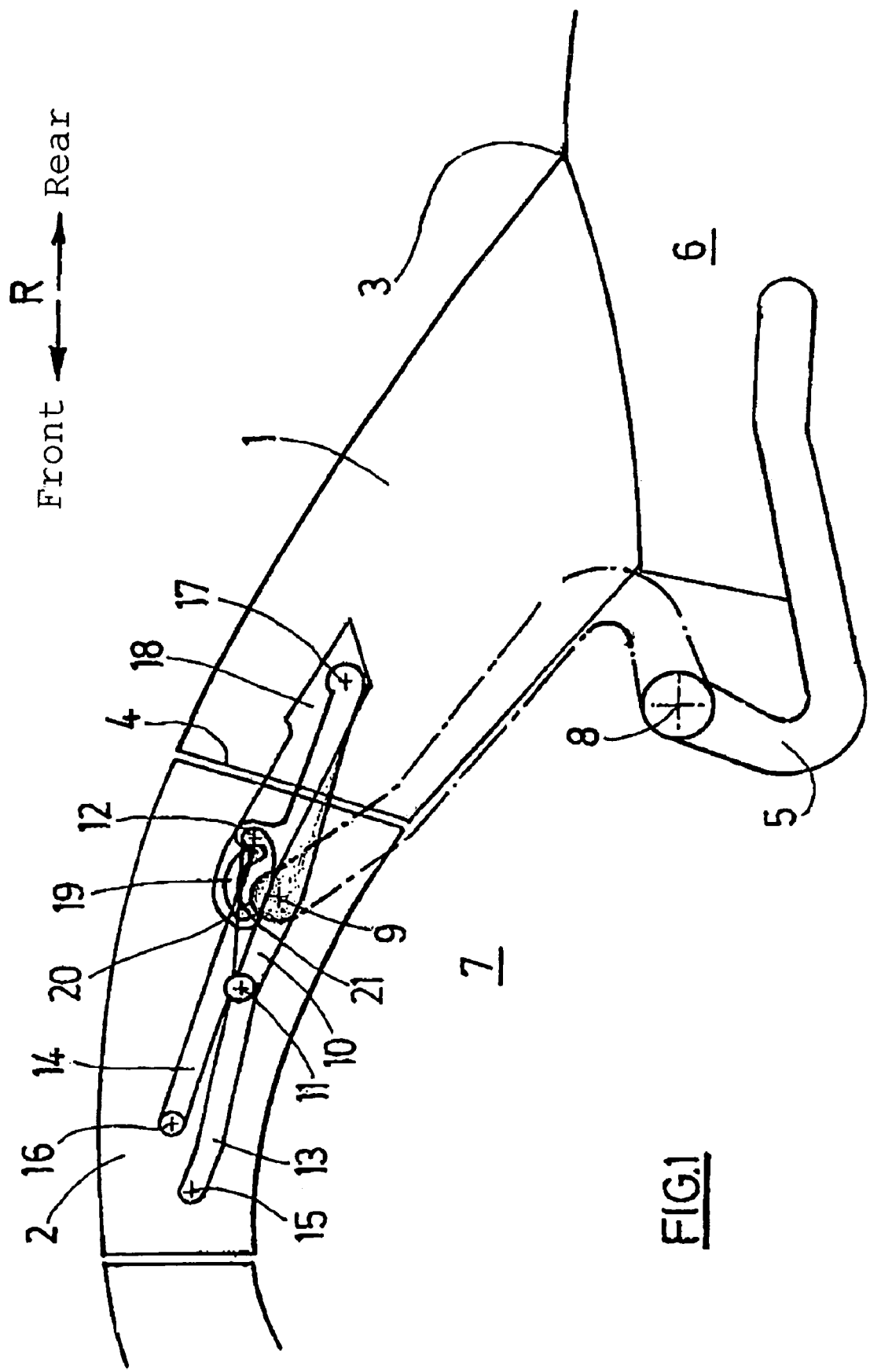
FIG. 1 is a schematic view in partial longitudinal section of a vehicle equipped with a retractable roof according to the invention.
Figure 2:
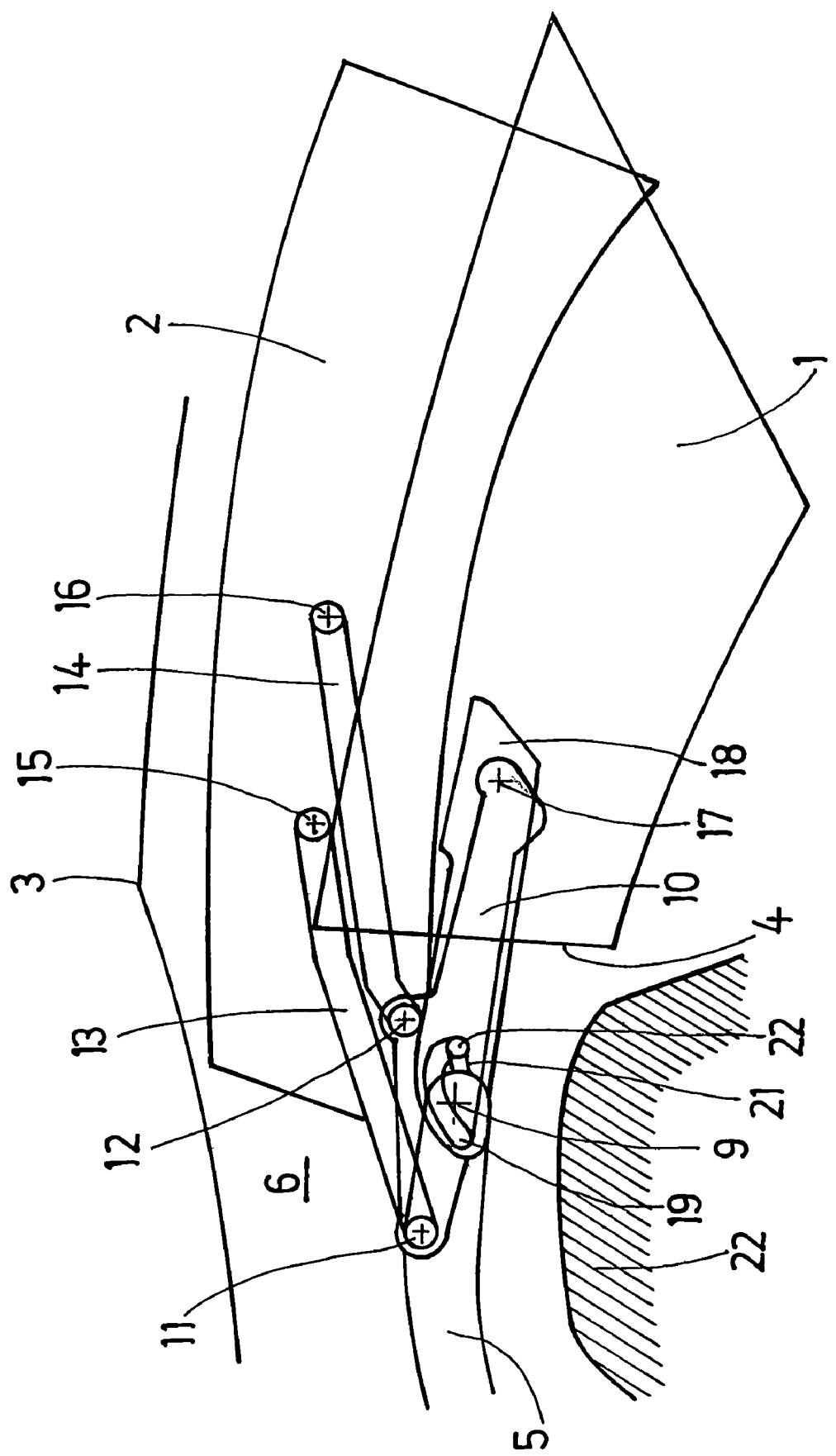
FIG. 2 is a view similar to FIG. 1, the retractable roof being in position stored in the vehicle boot.
Figure 3:
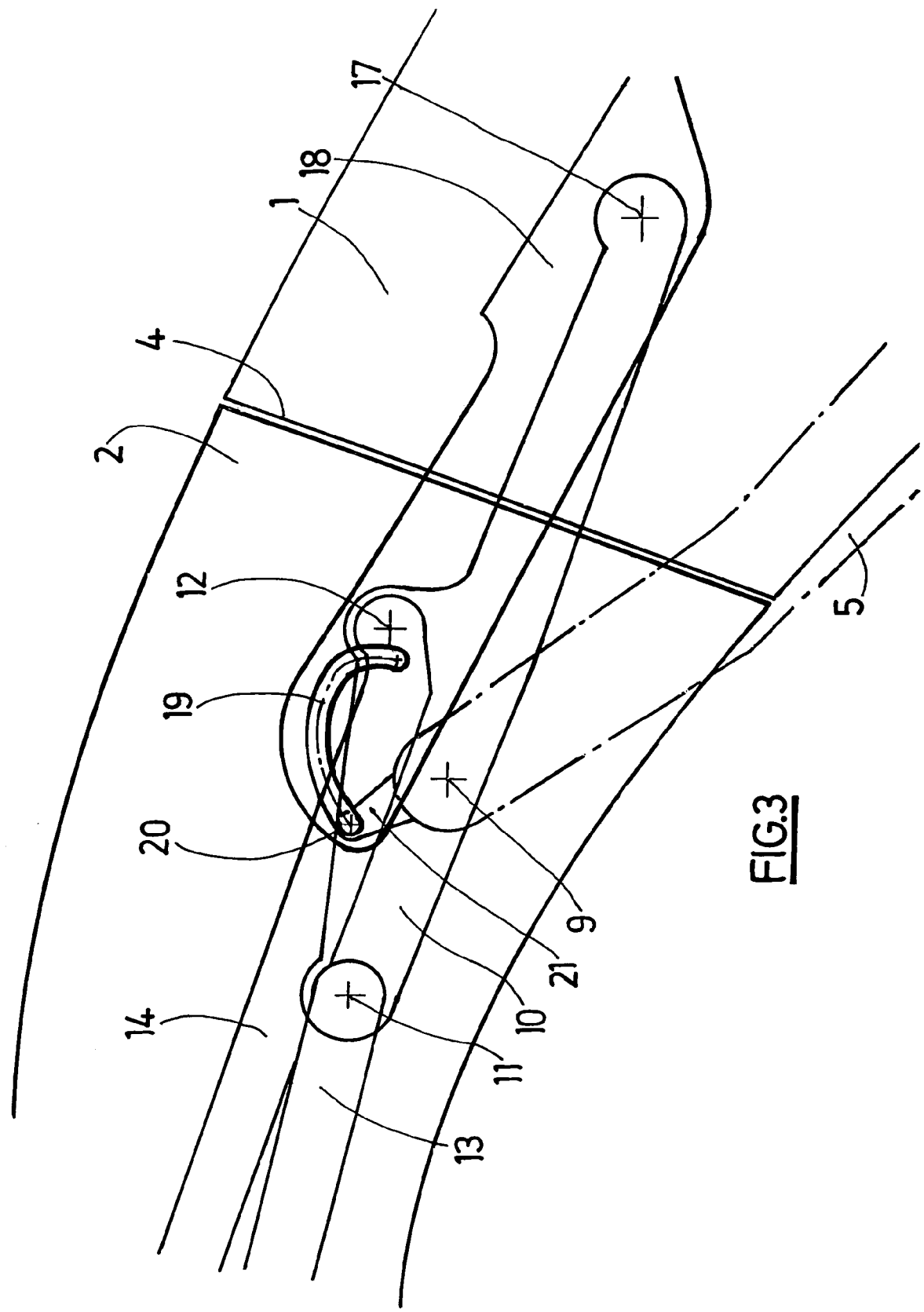
FIG. 3 is a partial enlarged view of FIG. 1.
Figure 4:
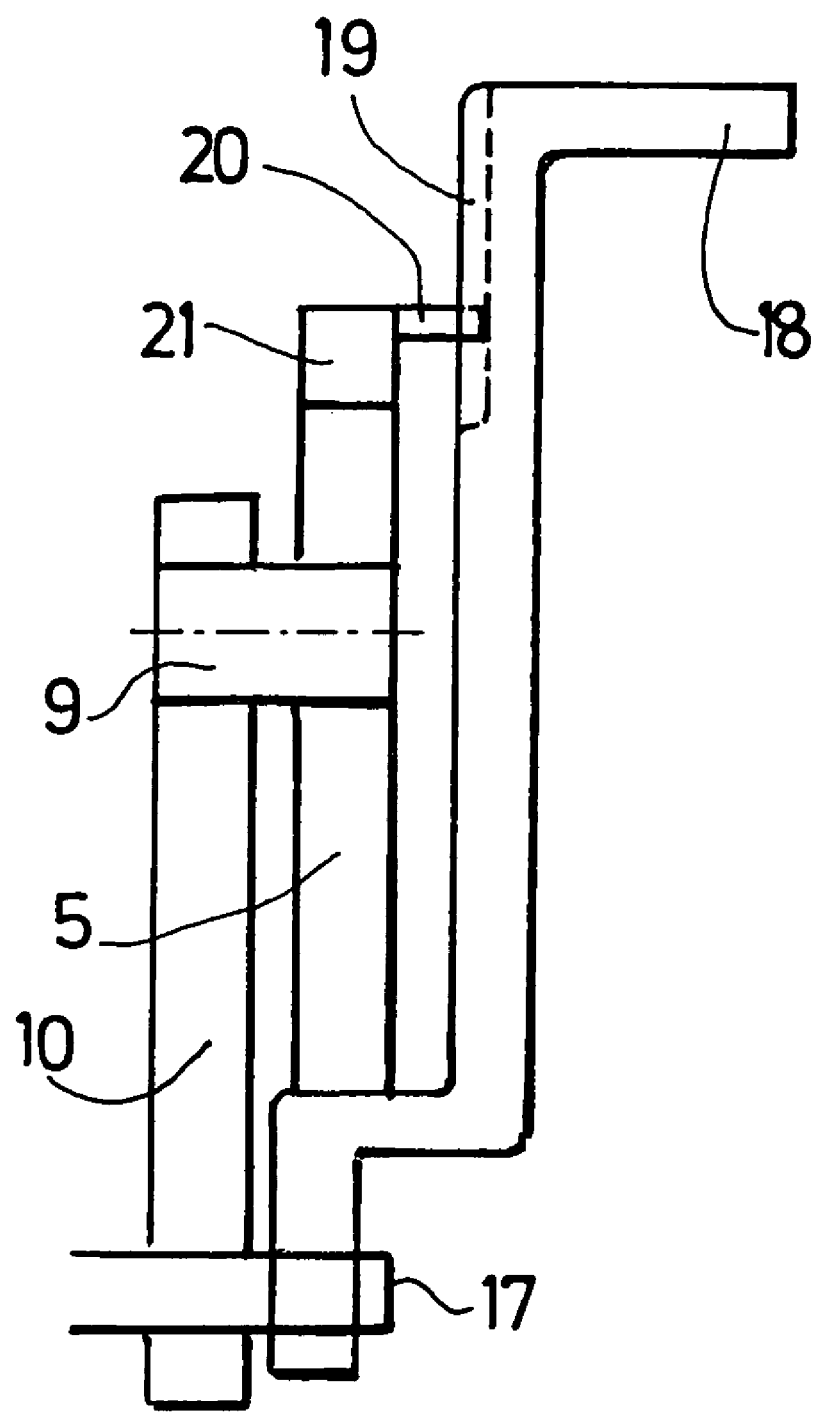
FIG. 4 is a plan view of the elements depicted in FIG. 3.

The movement of the whole of the two elements 1 and 2 of the roof is controlled by an arm 5 depicted in FIG. 1 in continuous lines in the position where the roof is retracted in the rear boot 6 of the vehicle and in dot and dash lines in the position where the roof covers the cabin 7 of this vehicle.

In the position where the roof is retracted in the rear boot 6, the two elements 1 and 2 are superimposed substantially horizontally with the front element 2 disposed above the rear element 1.

The arm 5 is articulated about an axis 8 on the vehicle chassis, the axis 8 being perpendicular to the vertical symmetry plane of the vehicle.

The arm 5 has its general direction oriented in the covering position of the roof from the axis 8 upwards and forwards (reference R). In the storage position of the roof, the arm 5 has its general direction oriented from the axis 8 towards the rear.

The arm 5 is angled, its concavity being directed forwards in the closure position of the roof and rearwards in the storage position of the roof.

All the articulation axes which will be dealt with below are transverse axes, that is to say parallel to the axis 8, that is to say perpendicular to the vertical symmetry plane of the vehicle.

The end of the arm 5 opposite to the axis 8 is articulated at 9 on a connecting rod 10.

Two levers 13, 14, at their first end, are articulated at 11, 12 on the connecting rod 10.

The other ends of the two levers 13, 14 are articulated at 15 and 16 on the front element 2 of the roof.

The two levers 13 and 14 form an articulated quadrilateral.

The articulations 11 and 12 are situated substantially on each side of the articulation 9 at approximately the same distance.

On the opposite side to the articulation 11 with respect to the articulation 12, the connecting rod 10 is articulated at 17 on a support element 18. The support element 18 is integral and fixed with respect to the rear roof element 1.

The connecting rod 10 is articulated at 17 on the support element 18.

From the articulation 17, the connecting rod 10 and the support element 18 are directed generally towards the front of the vehicle.

On the opposite side to the articulation 17 and longitudinally generally level with the articulation 9, the support element 18 comprises a cam track or groove 19 forming a cam track for a cam follower 20.

The cam follower 20 is carried by a lug 21 fixed to the arm 5 projecting from this arm substantially opposite to the axis 8 so that the axis 8, the articulation 9 and the cam follower 20 are generally opposed.

The groove 19 is curved with its concavity turned towards the articulation 9. The angle between the connecting rod 10 and the support element 18 varying relatively little during the movement, the concavity of the groove 19 remains turned, in a general fashion, towards the articulation 9.

The groove 19 has its curvature increasing from front to rear.

The cam follower 20 is in abutment at the front end of the groove 19 when the roof is in its closure position and at the rear of the groove 19 when the roof is in its position of storage in the rear boot of the vehicle.

The measurements of the various articulation points, as well as the precise shape of the groove 19, naturally depend on the particular vehicle to which the invention is applied. It should be noted however that the connecting rod 10 and the support element 18 remain generally horizontal during the movements whilst the arm 5 tilts between these front and rear positions and the cam follower 20 moves from one end of the groove 19 to the other.

The arrangement which has just been described makes it possible, by virtue of the movement of the cam follower 20 in the groove 19, to raise the connecting rod 10.

In the stored position, it is thus possible to tilt the whole of the roof without the connecting rod 10 coming into abutment against the damper 22.

In addition, this raising of the link 10 makes it possible not to have to angle the levers 13, 14.

In the embodiment depicted in the figures, the roof comprises two elements, however the invention also applies to a retractable roof comprising more than two elements and in particular three elements.

The third element can be placed between the element 2 and the vehicle windscreen. The third element is articulated on the element 2 by one or more levers, the movement of the third element being able to be independent or coordinated with the movement of the elements 1, 2.

Naturally the relative positions of the various elements are given here in the context of the application of the invention to a private car. These positions could be different in another vehicle.

The invention claimed is:

1. A retractable roof in at least two elements (1, 2), for vehicles comprising a chassis, a cabin (7) for passengers and a rear boot (6), the roof comprising a front roof element (2) and a rear roof element (1), these two elements (1, 2) being able to move between a first position in which they cover the cabin (7) and a second position in which they are superimposed substantially horizontally in the rear boot (6), the movement of the rear element (1) towards the rear boot (6) being controlled by at least one arm (5) articulated at a first of its ends on the chassis, and the front element (2) being connected to the rear element (1) by means of two levers (13, 14) each articulated at a first (15, 16) of its ends on the front element (2), these two levers (13, 14) forming a deformable quadrilateral, characterised by the fact that it comprises a connecting rod (10) and a support element (18), the arm (5) being articulated at its second end on the connecting rod (10), on which there are also articulated the second ends of the said levers (13, 14), the connecting rod (10) being articulated on the said support element (18) carrying a cam track (19) able to cooperate with a cam follower (20) fixed to the arm (5).

2. A retractable roof according to claim 1, characterised in that the cam follower (20) is mounted on the arm (5) projecting (21) from its second end, substantially opposite to its first end.

3. A retractable roof according to claim 1, characterised in that the arm (5) is articulated on the connecting rod (10) substantially between the points of articulation (11, 12) of the two levers (13, 14).

4. A retractable roof according to claim 3, characterised in that the point of articulation (9) of the arm (5) is substantially equidistant from the points of articulation (11, 12) of the levers (13, 14).

5. A retractable roof according to claim 1, characterised in that one (14) of the levers is articulated on the connecting rod (10) substantially between the points of articulation (11, 17) of the other lever (13) and of the support element (18).

6. A retractable roof according to claim 5, characterised in that the point of articulation (12) of one of the levers (14) is substantially equidistant from the point of articulation (11) of the other lever (13) and the point of articulation (17) of the support element (18).

7. A retractable roof according to claim 1, characterised in that the points of articulation (9, 11, 12, 17) of the arm (5), of the levers (13, 14) and of the support element (18) are aligned on the connecting rod (10).

8. A retractable roof according to claim 1, characterised in that the cam track (19) is curved with its concavity turned towards the point of articulation (9) of the arm (5) on the connecting rod (10).

9. A retractable roof according to claim 8, characterised in that the curvature of the cam track (9) increases from front to rear.

10. A vehicle comprising a roof according to claim 1.

* * * * *